(12) United States Patent
Shimizu et al.

(10) Patent No.: US 7,333,132 B2
(45) Date of Patent: Feb. 19, 2008

(54) CORRECTED IMAGE GENERATING APPARATUS AND CORRECTED IMAGE GENERATING PROGRAM STORAGE MEDIUM

(75) Inventors: Katsutoshi Shimizu, Kawasaki (JP); Hiroki Shimomae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 10/078,433

(22) Filed: Feb. 21, 2002

(65) Prior Publication Data

US 2004/0201706 A1 Oct. 14, 2004

(30) Foreign Application Priority Data

Oct. 26, 2001 (JP) .............................. 2001-328905

(51) Int. Cl.
*H04N 5/228* (2006.01)
(52) U.S. Cl. .................................... 348/208.1; 348/335
(58) Field of Classification Search ............ 348/208.1, 348/699, 219.1; 382/284
See application file for complete search history.

(56) References Cited

U.S. PATENT DOCUMENTS 5,371,539 A * 12/1994 Okino et al. ............. 348/208.6
5,798,786 A * 8/1998 Lareau et al. ................ 348/144
5,886,744 A * 3/1999 Hannah ................... 375/240.16
5,903,307 A * 5/1999 Hwang ..................... 348/208.1
6,215,914 B1* 4/2001 Nakamura et al. .......... 382/284
6,404,901 B1* 6/2002 Itokawa ....................... 382/103
2002/0057346 A1* 5/2002 Hirasawa et al. ........... 348/208
2003/0133035 A1* 7/2003 Hatano ....................... 348/362

FOREIGN PATENT DOCUMENTS

JP          08147473 A  *  6/1996
JP          2001-268431      9/2001

* cited by examiner

*Primary Examiner*—Tuan Ho
(74) *Attorney, Agent, or Firm*—Staas & Halsey LLP

(57) ABSTRACT

This invention provides a corrected image generating apparatus and the like for generating a corrected image by correcting a deflection due to the vibration of a camera in a raw image obtained by the camera which obtains the raw images of plural frames successively by scanning an object field of vision repeatedly in a scanning direction intersecting the arrangement direction of plural light receiving sensors composing the one-dimensional image pickup device in which the plural light receiving sensors are arranged one-dimensionally, in order to generate an image whose deflection is corrected. By obtaining a motion vector of each of short strips extending in the arrangement direction of the light receiving sensors of the one-dimensional image pickup device, the respective short strips are moved to obtain a corrected image.

17 Claims, 15 Drawing Sheets

CORRECTED IMAGE GENERATING APPARATUS AND CORRECTED IMAGE GENERATING PROGRAM STORAGE MEDIUM

BACKGROUND OF THE INVENTION

1. Field of the Invention

The present invention relates to a corrected image generating apparatus for generating a corrected image by correcting a deflection due to vibration of a camera in a raw image obtained from the camera which obtains plural frames of raw images by scanning an object field of vision repeatedly using a one-dimensional image pickup device in which plural light receiving sensors are arranged one-dimensionally in a scanning direction intersecting the arrangement direction of plural light receiving sensors composing the one-dimensional image pickup device, and a corrected image generating program storage medium storing a corrected image generating program which actuates a computer as such a corrected image generating apparatus.

2. Description of the Related Art

In a conventional system for photographing the ground in clear image using an infrared ray camera from, for example, an airplane, helicopter or the like, plural frames of images are taken in succession by scanning the object field of vision repeatedly by means of such a one-dimensional image pickup device.

When the ground is photographed from the airplane, helicopter or the like using such kind of an infrared ray camera, that infrared ray camera is vibrated due to vibration of the airplane or helicopter so that deflection occurs in the same screen in an interval of scanning because a two-dimensional image is obtained by scanning with the one-dimensional image pickup device. This deflection is different from that obtained in the two-dimensional image obtained by an ordinary camera employing ordinary two-dimensional CCD image pickup devices. This deflection cannot be corrected according to a deflection correction method for the two-dimensional image obtained from such an ordinary camera.

For the reason, conventionally, the infrared ray camera is provided with a damper mechanism for suppressing the vibration thereof.

However, when such a damper mechanism is mounted, the apparatus is enlarged and therefore, an airplane or helicopter capable of being provided with this infrared ray camera is limited to specific types. When such photographing is carried out on an airplane or helicopter incapable of being provided with the damper mechanism, a monitor person gets tired of monitoring due to a deflection of images so that he cannot bear long-time monitoring.

SUMMARY OF THE INVENTION

Accordingly, in views of the above-described problems, an object of the present invention is to provide a corrected image generating apparatus capable of generating an image in which any deflection is corrected even when a camera is vibrated without being provided with any damper mechanism or with a simple damper mechanism and a corrected image generating program storage medium storing a corrected image generating program for actuating a computer as such a corrected image generating apparatus.

To achieve the above object, according to an aspect of the present invention, there is provided a corrected image generating apparatus for generating a corrected image by correcting a deflection due to vibration of a camera in a raw image obtained by the camera which obtains the raw images of plural frames successively by scanning an object field of vision repeatedly using a one-dimensional image pickup device in which the plural light receiving sensors are arranged one-dimensionally in a scanning direction intersecting the arrangement direction of plural light receiving sensors composing the one-dimensional image pickup device, the corrected image generating apparatus comprising: a pattern matching portion for carrying out pattern matching processing about adjacent frames in each block obtained by dividing the raw image into grids; a feature point extracting portion for extracting the feature point on the pattern matching of the raw image according to a result of the pattern matching processing obtained by the pattern matching portion; a motion vector computing portion for obtaining the motion vector of the feature point based on the result of the pattern matching processing obtained by the pattern matching portion about the feature point extracted by the feature point extracting portion; and an image correcting portion for obtaining a corrected image in which deflection of the raw image is corrected based on the motion vector obtained by the motion vector computing portion about the feature point extracted by the feature point extracting portion.

The corrected image generating apparatus of the present invention obtains the corrected image based on the motion vector of the feature point obtained by the pattern matching processing. Consequently, the corrected image in which deflection of the raw image is corrected can be obtained from the raw image having an influence of vibration of the camera.

Preferably, the corrected image generating apparatus further comprises an image culling portion for generating a culling image by culling pixels of the raw image, the feature point extracting portion makes the pattern matching portion carry out the pattern matching processing about the culling image generated by the image culling portion so as to extract a feature point based on the result of the pattern matching processing about the culling image, and the motion vector computing portion makes the pattern matching portion carry out the pattern matching processing about a block of the feature point extracted by the feature point extracting portion in a raw image prior to culling so as to obtain a motion vector of the feature point based on the result of the pattern matching processing about the raw image.

When obtaining the feature point, it is necessary to carry out the pattern matching processing on an entire face of the raw image and it takes a quite long computation time. Thus, by generating a culling image to obtain the feature point on the culling image, the computation time can be reduced.

Because the motion vector is obtained by carrying out the pattern matching processing again about the raw image prior to the culling, its accuracy is not lowered. Further, because the motion vector only has to be obtained about the feature point, the computation can be finished in a short time.

Preferably, the motion vector computing portion obtains a motion vector of each short strip based on the motion vector of the feature point in the short strip composed of plural blocks arranged in the arrangement direction of plural blocks produced by dividing the raw image into grids and the image correcting portion obtains a corrected image by correcting the relation of the positions of the short strips based on the motion vector of each short strip obtained by the motion vector computing portion.

The same amount of deflection occurs in all the pixels at the same time in the arrangement direction of the plural light receiving sensors which compose the one-dimensional image pickup device. By correcting the positions of each short strip as a unit in which the above-described blocks are arranged in that arrangement direction, a higher accuracy correction is enabled with a simpler computation than a case of correcting each block.

In the embodiment in which the position correction is carried out in each short strip preferably, the motion vector computing portion obtains the most frequent value vector in a motion vector of the feature point in the short strip as a motion vector of the short strip.

When it is considered that the ground is photographed from an airplane or helicopter on which a camera is mounted, there may be an object which has a different deflection from that due to the vibration of the airplane or helicopter, such as a vehicle moving on the ground for example. Then, by employing the most frequent value vector having the highest frequency in motion vectors of typically plural feature points as the motion vector of that short strip, the high accuracy correction is enabled by avoiding a drop of the correction accuracy due to existence of an object having a different deflection from that due to the vibration of an airplane or helicopter.

Further, in the corrected image generating apparatus of the present invention, preferably, regardless of which the correction is carried out for each block or for each short strip, the motion vector computing portion obtains a new motion vector originated from vibration of the camera by carrying out processing including the filtering processing aiming at plural frames upon a just obtained motion vector and the image correcting portion obtains the corrected image based on the new motion vector obtained by the motion vector computing portion.

Considering a case of photographing the ground by mounting a camera on an airplane or helicopter, the photographing range is moved slowly accompanied by flight of that airplane or helicopter. Of the motion vector, a component accompanied by this motion is not related to this vibration. Then, by carrying out a processing including the filtering processing over plural frames as described above, components accompanied by slow moving of the photographing range can be removed so that the motion vector originated from the vibration of the camera can be extracted at a high accuracy, thereby enabling a higher accuracy correction.

Further, in the corrected image generating apparatus of the present invention, when a method of carrying out the correcting each short strip is employed, preferably, the image correcting portion obtains a corrected image in which deflection between adjacent short strips in the arrangement direction is eliminated by shifting pixels arranged in the scanning direction in a short strip in the said arrangement direction.

Consequently, it is possible to protect continuity of an image from being lost at a joint between the short strips thereby making it possible to generate a natural corrected image having continuity.

Further, preferably, the corrected image generating apparatus of the present invention further comprises an on-zooming discriminating portion for discriminating whether or not zooming is being carried out based on a motion vector obtained by the motion vector computing portion, wherein when the on-zooming discriminating portion discriminates that zooming is being carried out, the image correcting portion interrupts generation of the corrected image.

The reason is that generation of the corrected image during zooming is meaningless and there is a possibility that an inaccurate corrected image may be produced.

To achieve the above object, the present invention provides a corrected image generating program storage medium storing a corrected image generating program which is executed in a computer and employed for actuating the computer as a corrected image generating apparatus for generating a corrected image by correcting a deflection due to vibration of a camera in a raw image obtained by the camera which obtains the raw images of plural frames successively by scanning an object field of vision repeatedly using a one-dimensional image pickup device in which the plural light receiving sensors are arranged one-dimensionally in a scanning direction intersecting the arrangement direction of plural light receiving sensors composing the one-dimensional image pickup device, the corrected image generating program comprising: a pattern matching portion for carrying out pattern matching processing about adjacent frames in each block obtained by dividing the raw image into grids; a feature point extracting portion for extracting the feature point on the pattern matching of the raw image according to a result of the pattern matching processing obtained by the pattern matching portion; a motion vector computing portion for obtaining the motion vector of the feature point based on a result of the pattern matching processing obtained by the pattern matching portion about the feature point extracted by the feature point extracting portion; and an image correcting portion for obtaining a corrected image in which deflection of the raw image is corrected based on the motion vector obtained by the motion vector computing portion about the feature point extracted by the feature point extracting portion.

Here, the corrected image generating program of the present invention includes all the embodiments corresponding to respective embodiments of the corrected image generating apparatus of the present invention.

DESCRIPTION OF THE PREFERRED EMBODIMENTS

Hereinafter, the preferred embodiments of the present invention will be described.

Figure 1:
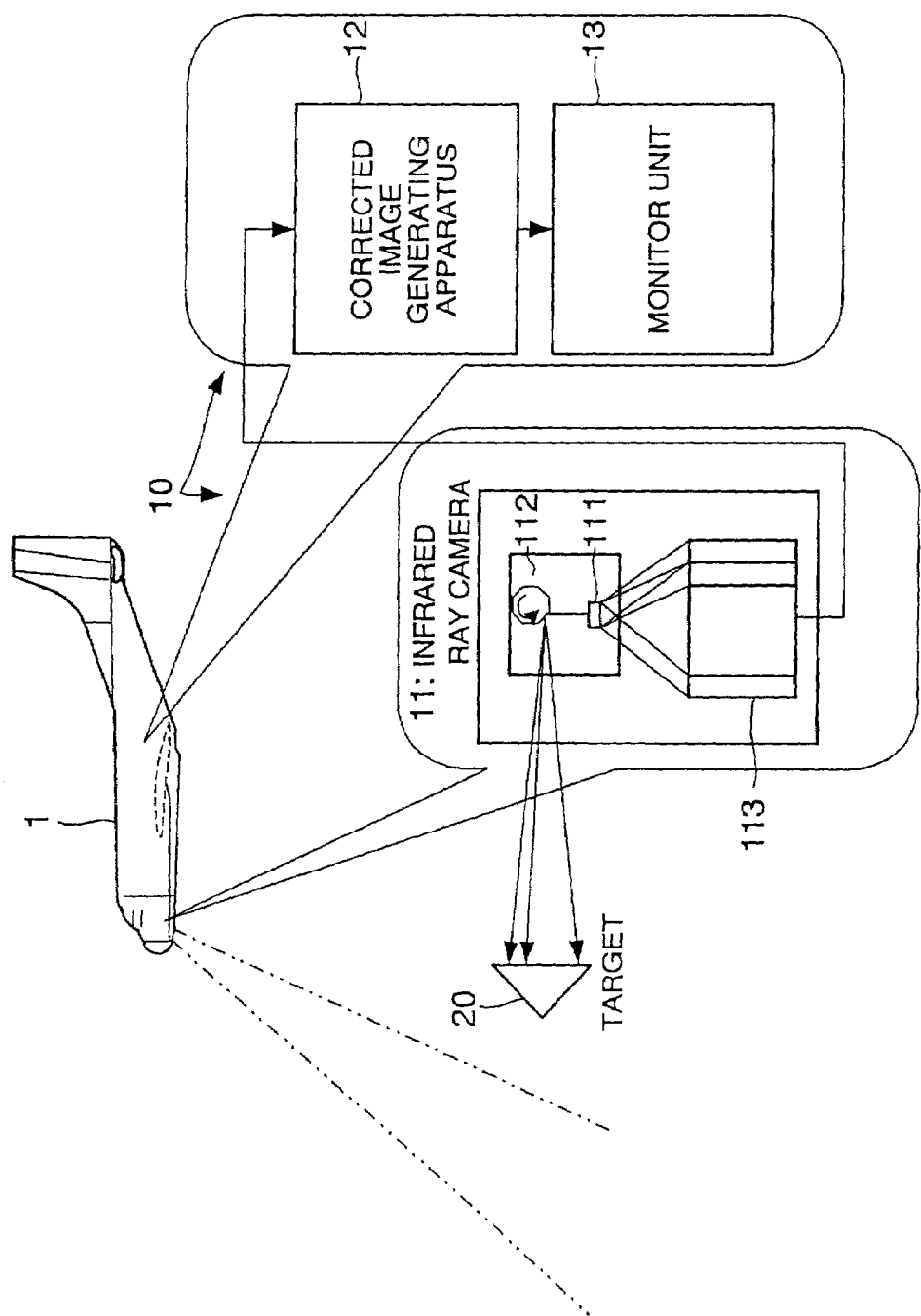
FIG. 1 is a schematic view of a photographing system including an embodiment of a corrected image generating apparatus of the present invention.

FIG. 1 is a schematic view of a photographing system including an embodiment of the corrected image generating apparatus of the present invention.

This photographing system 10 is a photographing system which is mounted on an airplane 1 for photographing the ground.

This photographing system 10 comprises an infrared ray camera 11, a corrected image generating apparatus 12, which is an embodiment of the present invention and a monitor unit 13 for displaying an image.

The infrared ray camera 11 has a one-dimensional image pickup device 111 in which a plurality of infrared ray receiving sensors are disposed one-dimensionally in a predetermined arrangement direction. By rotating a rotary polygon mirror 112, an image of a target 20 on the ground is scanned repeatedly over the one-dimensional image pickup device 111 so as to photograph images of plural frames. The image taken by this photographing (hereinafter referred to as 'raw image') is stored in an image memory 113 temporarily and after that, inputted to a corrected image generating apparatus 12. This corrected image generating apparatus 12 generates a corrected image in which deflection of the raw image caused by vibration of the infrared ray camera 11 accompanied by the vibration of the airplane 1 is corrected as described later. This generated corrected image is sent to the monitor unit 13 successively by each frame and the image on the ground is displayed on a display screen of that monitor unit 13, so that the monitor person can see it.

Figure 2:
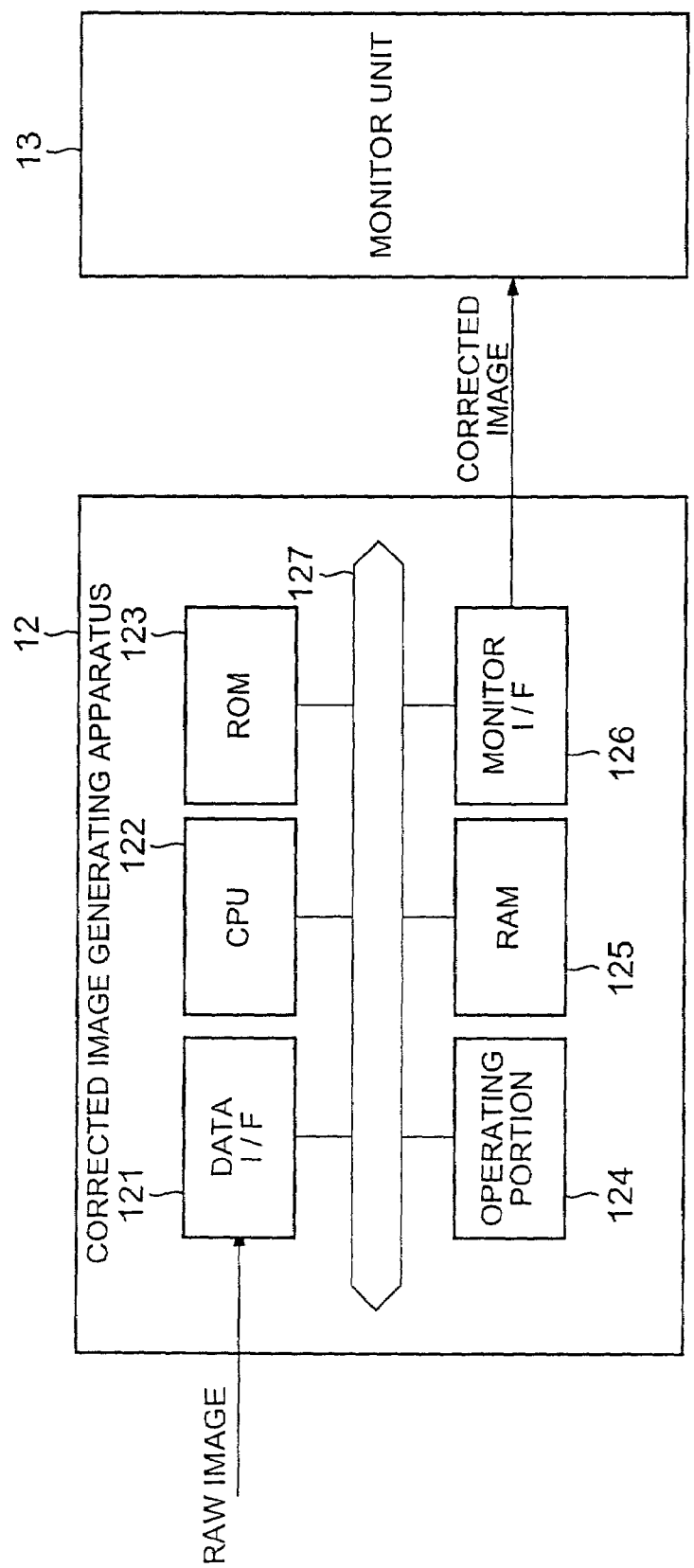
FIG. 2 is a hardware configuration diagram of the corrected image generating apparatus indicated with a single block.

FIG. 2 is a hardware configuration diagram of the corrected image generating apparatus 12 indicated with a single block in FIG. 1.

The corrected image generating apparatus 12 has a configuration of a computer in terms of its hardware and comprises a data interface 121 for receiving an input of the raw image from the infrared ray camera 11, a CPU 122 for executing various kinds of programs, a ROM 123 in which various kinds of programs are stored, an operating portion 124 in which operating elements for instructing correction startup, reset and the like are disposed, a RAM 125 used as a working region of a program to be executed in the CPU 122 or storage region for various kinds of data and a monitor interface 126 for sending the corrected image to the monitor unit 13. These components are connected to each other through a bus 127.

The corrected image generating apparatus 12 of FIG. 2 exerts its function as a corrected image generating apparatus in cooperation with a corrected image generating program which is stored in the hardware and ROM 123 shown in FIG. 2, read out by the CPU 122 and then executed.

Figure 3:
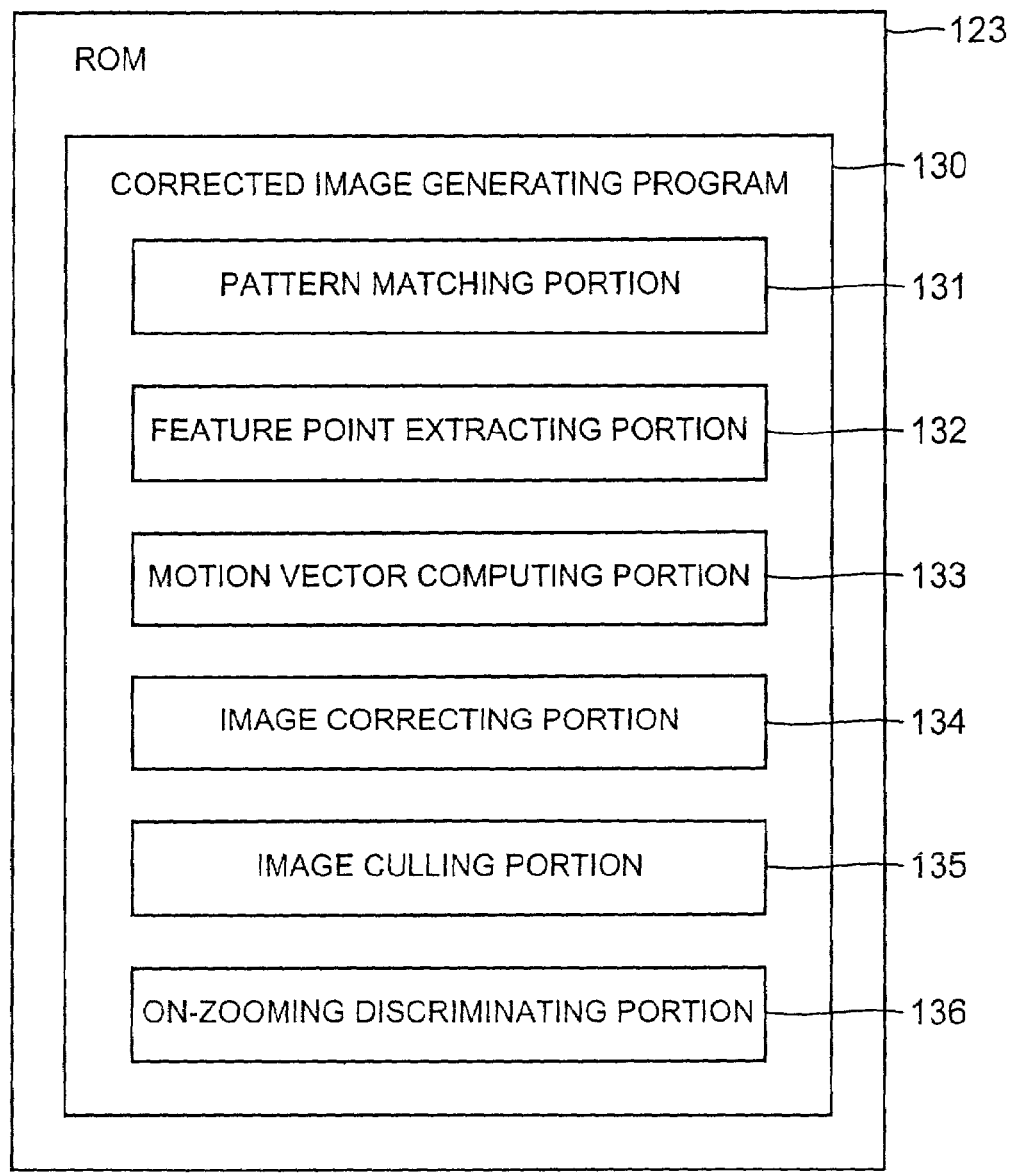
FIG. 3 is a schematic view of a corrected image generating program according to an embodiment of the present invention.

FIG. 3 is a schematic diagram of a corrected image generating program according to an embodiment of the present invention stored in the ROM 123.

The corrected image generating program 130 stored in this ROM 123 comprises a pattern matching portion 131, a feature point extracting portion 132, a motion vector computing portion 133, an image correcting portion 134, an image culling portion 135 and an on-zooming discriminating portion 136. Operations of these components will be described later.

Figure 4:
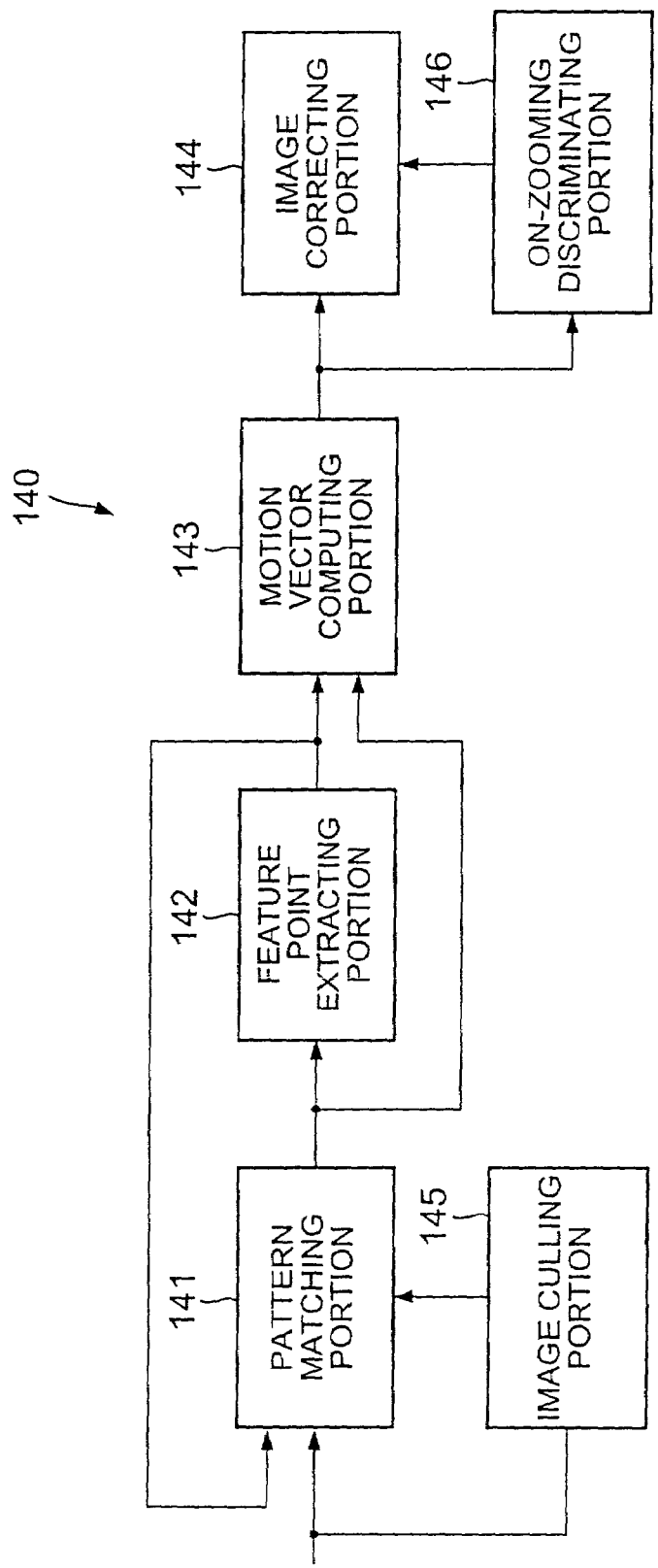
FIG. 4 is a functional block diagram of the corrected image generating apparatus of the present invention.

FIG. 4 is a functional block diagram of the corrected image generating apparatus of the present invention. This corrected image generating apparatus 140 is constituted of combination between hardware of the corrected image generating apparatus 12 shown in FIG. 2 and the corrected image generating program stored in the ROM.

The corrected image generating apparatus 140 of FIG. 4 comprises a pattern matching portion 141, a feature point extracting portion 142, a motion vector computing portion 143, an image correcting portion 144, an image culling portion 145 and an on-zooming discriminating portion 146. The respective components 141 to 146 of the corrected image generating apparatus 140 of FIG. 4 correspond to the respective components 131 to 136 of the corrected image generating program 130 of FIG. 3. Although the respective components 141 to 146 of the corrected image generating apparatus 140 of FIG. 4 is constituted of a combination between computer hardware and software, the respective components 131 to 136 of the corrected image generating program 130 of FIG. 3 is constituted of only the software portion.

Operations of the respective components 131 to 136 of the corrected image generating program 130 of FIG. 3 are equal to operations of the respective components 141 to 146 of the corrected image generating apparatus of FIG. 4 when the corrected image generating program 130 is executed by the CPU 122 of FIG. 2. By explaining the operations of the respective components 141 to 146 of the corrected image generating apparatus 140 of FIG. 4, description of the operations of the respective components 131 to 136 of the corrected image generating program 130 is carried out at the same time.

In the corrected image generating apparatus 140 of FIG. 4, which employs the one-dimensional image pickup device in which a plurality of the light receiving sensors are arranged one-dimensionally, an object field of vision is scanned repeatedly using a one-dimensional image pickup device in a scanning direction intersecting the arrangement direction of the plural light receiving sensors composing the one-dimensional image pickup device so that a raw image of plural frames can be obtained successively by a camera. This corrected image generating apparatus corrects a deflection due to vibration of the camera in the obtained raw image so as to generate a corrected image.

The pattern matching portion 141 of this corrected image generating apparatus 140 carries out pattern matching processing on adjacent frames about respective blocks produced by dividing the raw image into grids.

The feature extracting portion 142 extracts a block as the feature point on the pattern matching of the raw image based on a result of the pattern matching processing obtained by the pattern matching portion 141.

Further, the motion vector computing portion 143 obtains a motion vector of the feature point based on a result of the pattern matching processing obtained by the pattern matching portion 141 regarding the feature points (blocks) extracted by the feature point extracting portion 142. The image correcting portion 144 obtains the corrected image in which deflection of the raw image is corrected based on the motion vector obtained by the motion vector computing portion 143 regarding the feature points extracted by the feature point extracting portion 142.

The corrected image generating apparatus 140 of FIG. 4 has the image culling portion 145, which generates a culling image by culling pixels from the raw image.

When this image culling portion 145 is actuated, the feature point extracting portion 142 makes the pattern matching portion 141 execute the pattern matching processing on a culling image generated by the image culling portion 145, so that a feature point is extracted based on a result of the pattern matching processing about this culling image.

At this time, the motion vector computing portion 143 makes the pattern matching portion 141 execute the pattern matching processing on a block belonging to the feature point extracted by the feature point extracting portion 142 of the raw image before culling, and a motion vector of the feature point is obtained based on a result of the pattern matching processing about this raw image.

Further, according to this embodiment, the motion vector computing portion 143 obtains the motion vector of each short strip based on the motion vector of the feature point in the short strip composed of plural blocks arranged in arrangement direction, each in which the light receiving sensors of the one-dimensional image pickup device are arranged, the plural blocks being obtained by dividing the raw image into grids, and the image correcting portion 144 corrects the relative positions of short strips based on the motion vector of each short strip obtained by the motion vector computing portion 143 so as to obtain a corrected image.

Then, the motion vector computing portion 143 obtains a most frequent value vector in the motion vectors of the feature point in a short strip as a motion vector of that short strip.

According to this embodiment, the motion vector 143 executes processing including filtering over plural frames upon an obtained motion vector so as to obtain a new motion vector originated from vibration of the camera. The image correcting portion obtains a corrected image based on the new motion vector obtained by the motion vector computing portion 143.

Further, according to this embodiment, by shifting pixels arranged in the scanning direction intersecting the arrangement direction of the light receiving sensors in the one-dimensional image pickup device in a short strip in the arrangement direction, a corrected image in which deflection of adjacent short strips in the arrangement direction is eliminated is obtained.

According to this embodiment, the on-zooming discriminating portion 146 for discriminating whether or not zooming is being carried out based on a motion vector obtained by the motion vector computing portion 143 is provided. When it is discriminated that zooming is being carried out by the on-zoom discriminating portion 146, generation of the corrected image is interrupted in the image correcting portion 144.

Hereinafter, the present invention will be described further in detail.

Figure 5:
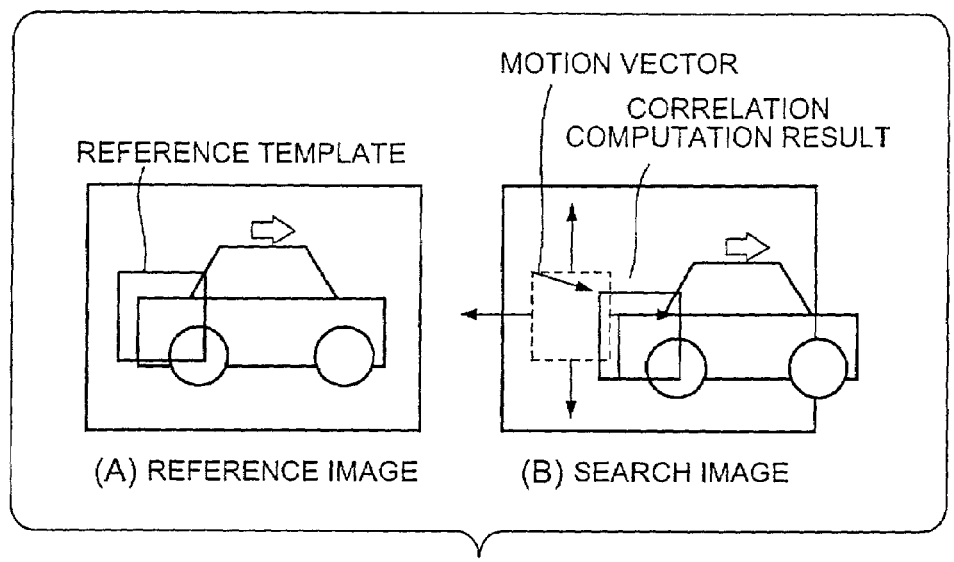
FIG. 5 is an explanatory diagram of pattern matching processing.

FIG. 5 is an explanatory diagram of the pattern matching processing.

Here, a reference image (part (A) of FIG. 5) and a search image (part (B) of FIG. 5) are prepared and part of the reference image is cut out as a reference template.

Next, this cut out reference template is overlaid at any position of the search image and a following computation is carried out. That is, when a pixel value of each pixel of the reference template is $R(x, y)$, a pixel value of a pixel overlapping the pixel $(x, y)$ of the reference template in a region on which the reference template is overlaid of the search image is $T(x, y)$ and a sum of all region of the reference template is expressed in $$\sum_x \sum_y$$

while an absolute value thereof is expressed in $|\ldots|$, $$S = \sum_x \sum_y |R(x, y) - T(x, y)| \qquad (1)$$

is obtained.

When the pixel value $T(x, y)$ of each pixel in a region on which the reference template is overlaid is equal to the pixel value $R(x, y)$ of each pixel corresponding to the reference template in that overlapping entire region, the expression (1) is $S=0$. The more different from the reference template the region on which the reference template is overlaid of the search image is, the larger the value S is.

The computation of this expression (1) is carried out at each scanning point while scanning the search image with the reference template.

Figure 6:
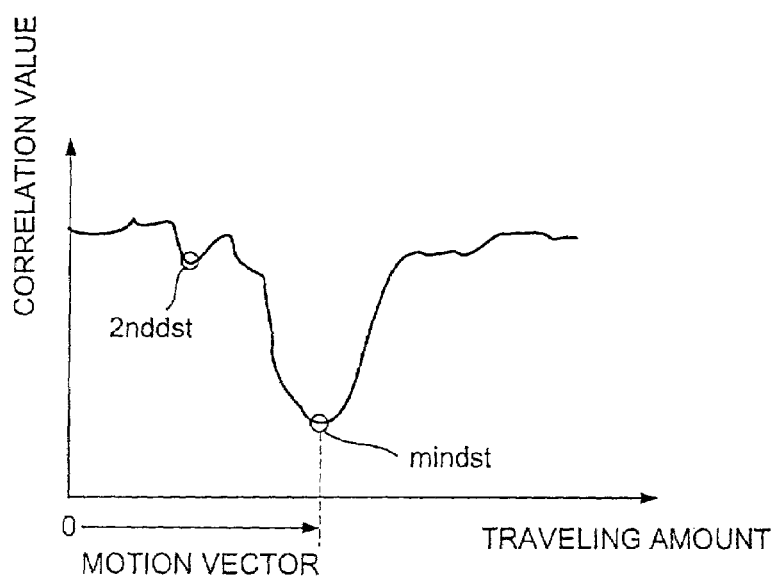
FIG. 6 is a diagram showing a result of the pattern matching processing.

FIG. 6 is a diagram showing a result of the pattern matching processing carried out in the above way.

Although in the pattern matching processing of FIG. 1, computation of the expression (1) is carried out by scanning the search image with the reference template two-dimensionally, FIG. 2 shows a result of the computation of the expression (1) carried out by scanning the reference template one-dimensionally for simplification.

Here, a maximum peak value (minimum value) downward of the computation result of the expression (1) in the scanning range is called mindst while a second peak value downward is called 2nddst.

Here, it is assumed that an effective motion is detected when 2nddst−mindst>threshold (2) and mindst<threshold (3). The threshold of the expression (2) does not have to be equal to the threshold of the expression (3). A point in which this effective motion is detected is called feature point. At this time, this motion vector is obtained as a traveling amount of the reference template from the same position as a position in which the reference template is cut out from a reference image, on the search image up to a scanning point in which mindst is obtained by scanning the search image with the reference template. This motion vector indicates the moving direction of the reference template region on the reference image and a moving amount thereof when moved from the reference image to the search image.

It is permissible to employ a correlation computation in mathematical meaning instead of the expression (1) and it is also permissible to employ any computation as long as it is capable of obtaining the motion vector. Here, computation based on the expression (1) by scanning the search image with the reference template is called correlation computation.

Figure 7:
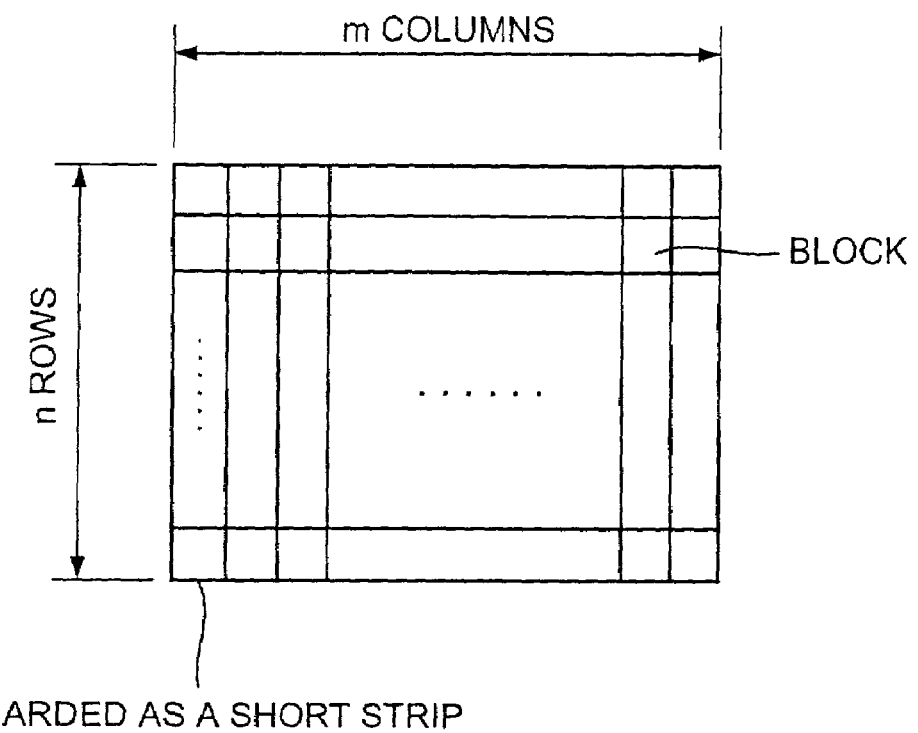
FIG. 7 is a composition diagram showing a condition in which a raw image is divided to plural blocks and short strips.

FIG. 7 is a structure diagram showing a condition in which the raw image obtained by the infrared ray camera 11 of FIG. 1 is divided to a plurality of blocks and short strips.

Here, the entire surface of the raw image is divided to n vertically×m laterally blocks. Each block has a size of 32 pixels vertically×32 pixels laterally.

A set of n blocks arranged vertically is called short strip.

The vertical direction in FIG. 7 is the arrangement direction of the plurality of the light receiving sensors composing the one-dimensional image pickup device 111 which constitutes the infrared ray camera 11 of FIG. 1 while the lateral direction is the scanning direction in which the object field of vision is scanned over the one-dimensional image pickup device 111 by rotating the rotary polygon mirror 112 of FIG. 1. Hereinafter, the arrangement direction and scanning direction are sometimes called vertical direction and lateral direction. Even when the camera is vibrated in the vertical direction, the one-dimensional image pickup device 111 is vibrated integrally, so that the interval between the pixels in the vertical direction is guaranteed at a high precision. As for the lateral direction, the interval between the pixels is changed by the vibration of the camera or may be moved vertically.

Figure 8:
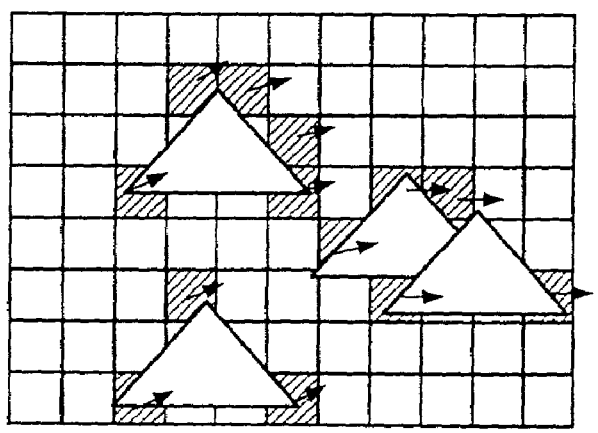
FIG. 8 is an explanatory diagram of feature points.

FIG. 8 is an explanatory diagram of the feature point.

According to this embodiment, a raw image of a certain frame is employed as the reference image explained with reference to FIG. 5 and a raw image of a next frame subsequent to that frame is employed as a search image. Each block obtained by dividing the reference image into blocks of n rows×m columns shown in FIG. 7 is used as a reference template shown in FIG. 5. That reference template is overlaid on the search image and then, pattern matching processing described with reference to FIGS. 5 and 6 is carried out. When the pattern matching processing is carried out with a certain block as the reference template, a block existing at the same position as a block as the reference template and eight adjacent blocks on the search image, totaling nine block regions are scanned with the reference template. Each time when the reference template is moved by a single pixel during that scanning, computation of the expression (1) is carried out. As a result, the pattern matching processing result (correlation computation result) is obtained as shown in FIG. 6. Although, in the pattern matching processing (correlation computation) as described above, the reference template scans the search image two-dimensionally, FIG. 6 shows one-dimensional scanning for simplification of the representation.

The pattern matching processing (correlation processing) is carried out and when the above-described expressions (2) and (3) are satisfied regarding a certain block (reference template), that block is called feature point and a motion vector is obtained about that "feature point".

FIG. 8 shows schematically the feature point (a hatched block) obtained in this way and motion vector of each feature point.

Figure 9:
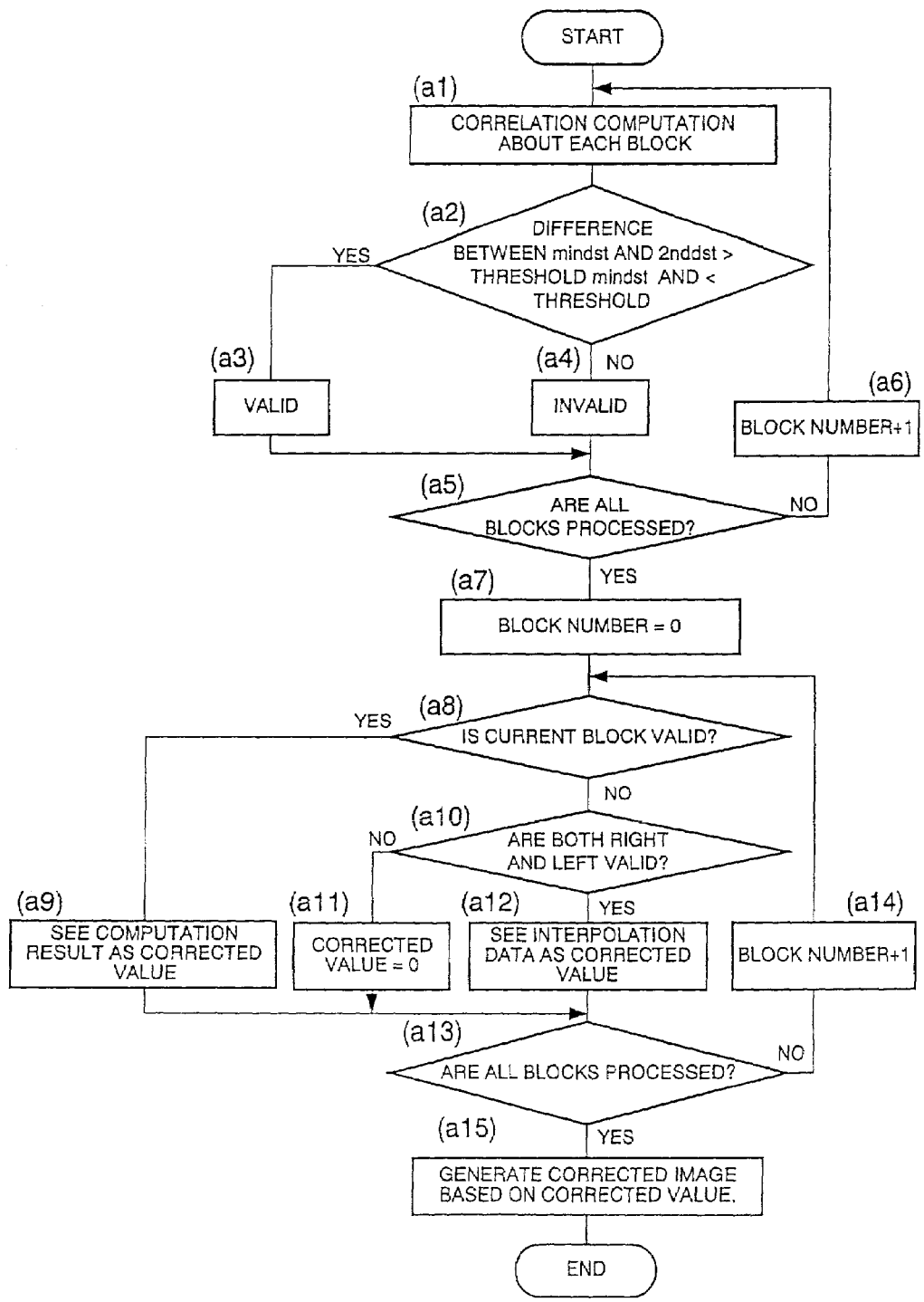
FIG. 9 is a flow chart showing a first example of processing in the corrected image generating apparatus of the present embodiment.

FIG. 9 is a flow chart showing a first example of the processing in the corrected image generating apparatus of this embodiment.

Here, correlation computation is carried out on adjacent two frames in the raw image (step a1) and whether or not the expressions (2) and (3) are satisfied is determined (step a2). When they are satisfied, that block is regarded as an effective block as the feature point (step a3) and otherwise, the block is regarded as an ineffective block as the feature point (step a4).

In step a5, whether or not the above-described processing (step a1 to a4) is finished on all blocks is determined. When there is a block not processed yet, the same processing is repeated on the next block (step a6).

When the correlation computation and determination on validity/invalidity as the feature point are carried out on all the blocks (step a5), following processing is carried out for all the blocks successively from the first block (steps a7, a13 and a14). That is, whether or not that block is an effective block as the feature point is determined (step a8) and when it is effective, a result of the computation on that block, that is, a motion vector obtained about that block is employed as a "corrected value" (step a9). When it is determined that that block is not an effective block as the feature point in step a8, whether or not right and left blocks to that block are effective is determined (step a10). When any one of the right and left blocks is an ineffective block, this block is set up so that the corrected value=0 (step a11).

When both the right and left blocks are effective, an average of those right and left corrected values (motion vector) is a corrected value of that block (step a12).

When the above-described processing is finished on all the blocks (step a13), each block is moved to a position based on the corrected value (motion vector) of each block so as to generate a corrected image (step a15). Here, a block in which the corrected value=0 does not mean that it is not moved, but the block is moved from a moving position of an effective block around it to an interpolated position.

Figure 10:
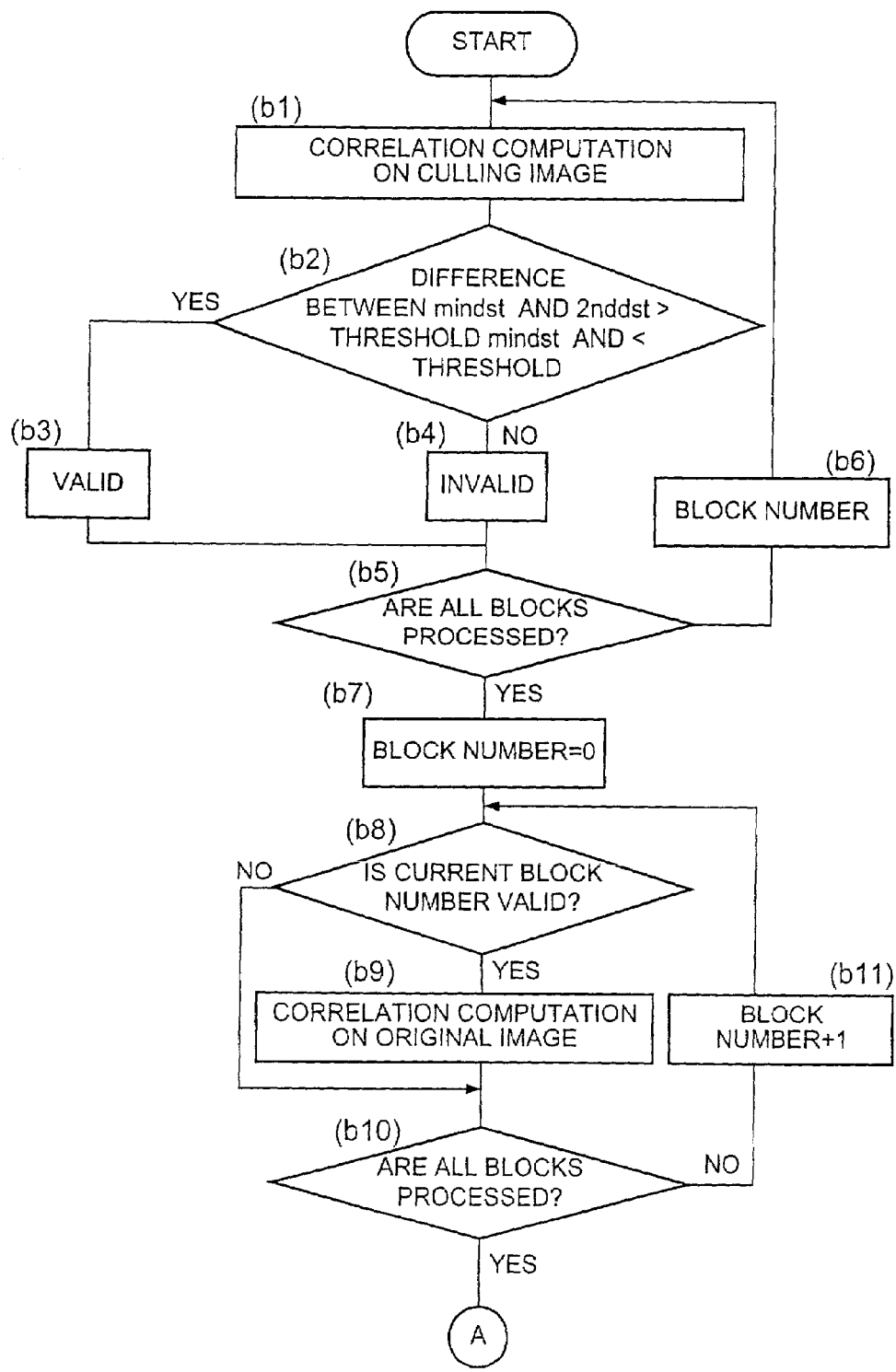
FIG. 10 is a flow chart showing a second example of processing in the corrected image generating apparatus of the present embodiment.
Figure 11:
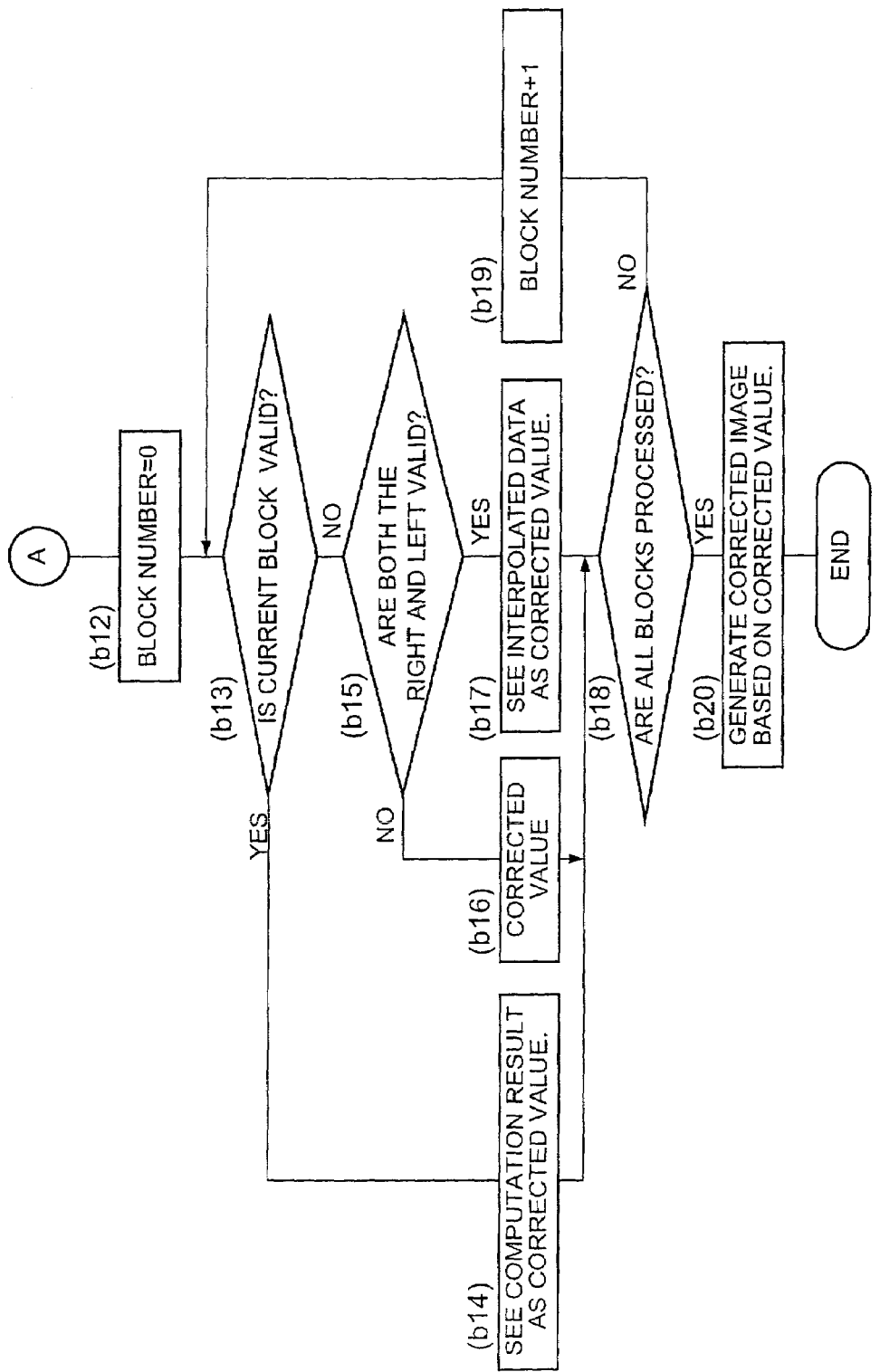
FIG. 11 is a flow chart showing a second example of processing in the corrected image generating apparatus of the present embodiment.

FIGS. 10 and 11 are flow charts showing a second example of the processing in the corrected image generating apparatus 12 of this embodiment.

First, an image of the raw image is culled so as to generate a culling image and then, the above-described correlation computation is carried out on the culling image (step b1). As an example, the image is culled to ¼ so that a block of 32 pixels×32 pixels becomes a block of 8 pixels×8 pixels. The steps b2 to b6 are equal to the steps a2 to a6 of FIG. 9 except a difference between the culling image and the original raw image and a duplicated description is omitted.

Next, whether or not each of all the blocks (steps b7, b10, and b11) is an effective block as the feature point is determined successively from the first block (step b8), and when it is an effective block, correlation computation is carried out about the original raw image prior to culling of that block (step b9) so as to obtain an accurate corrected value (motion vector) of the block.

Next, processing after the step b12 is carried out as FIG. 11. The processing of the respective steps b12 to b20 of FIG. 11 is equal to the processing of the steps a7 to a15 of FIG. 9 and a duplicated description thereof is omitted.

Because the correlation computation is carried out first about the culling image in the second example shown in FIGS. 10 and 11, the computation amount can be small so that the computation time is reduced. Although the correlation computation is carried out again on the original raw image about a block as the feature point, it is executed about only the block as the feature point so that the computation amount can be reduced as compared to the first example of FIG. 9.

Although the first example (FIG. 9) and the second example (FIGS. 10 and 11) indicate examples in which the corrected image is generated by moving the position of each block (see FIG. 7), as mentioned above, it is permissible to use the short strip composed of blocks arranged vertically as a moving unit by using a fact that deflection is made integrally in the vertical direction.

Figure 12:
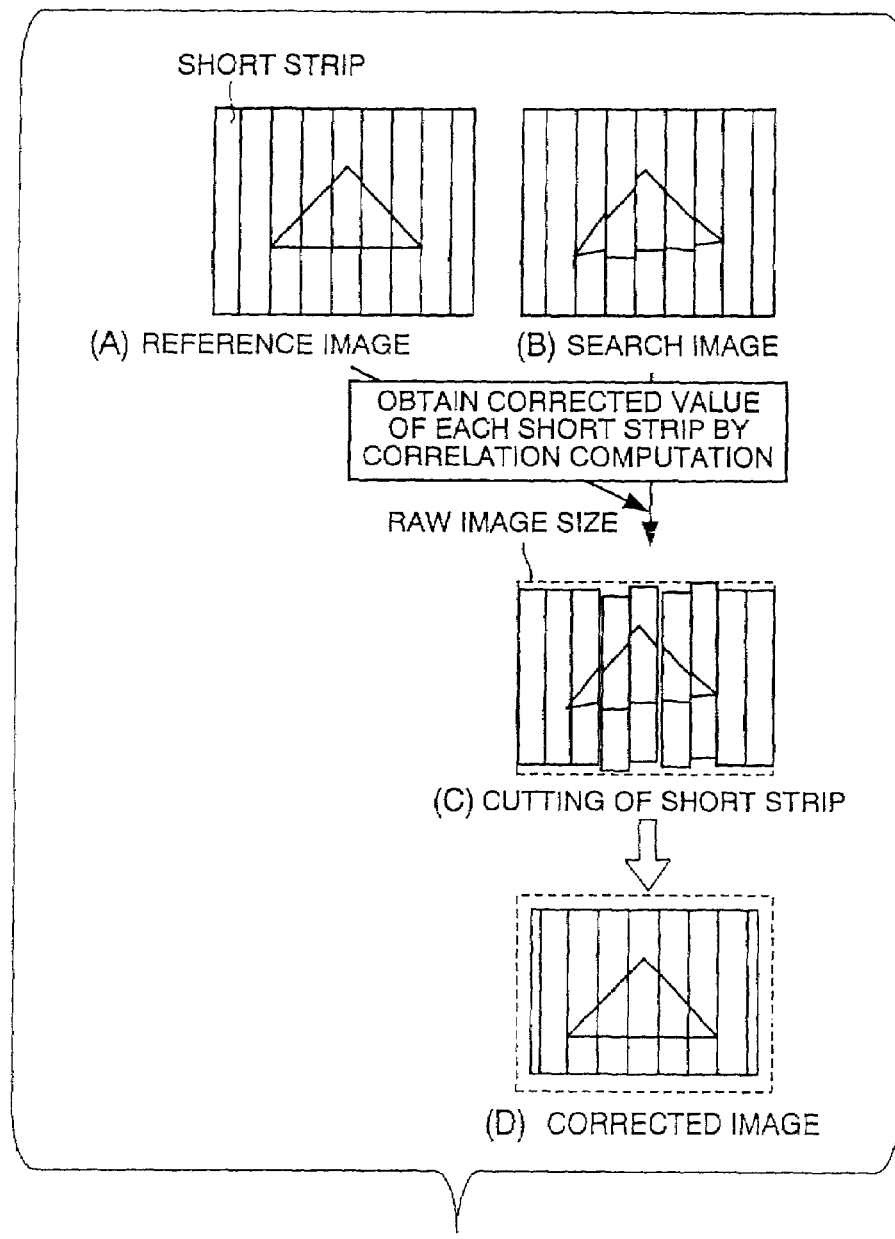
FIG. 12 is a conceptual diagram showing a case where the short strips are handled as the unit for moving (correcting) for corrected image generation.

FIG. 12 is a conceptual diagram showing a case in which the short strip is handled as the moving (correction) unit for generation of the corrected image.

The search image (B) of a next frame is disturbed with respect to the reference image (A). The corrected value of each short strip is obtained by correlation computation and by cutting out an image of each short strip with respect to each, its position is adjusted. Because the contour of the raw image is disturbed, it is cut out in a slightly smaller size than the raw image so as to generate the corrected image.

When the position of each short strip is adjusted, a gap is generated between adjacent short strips or the short strips overlap each other. When such a gap is generated, an image portion adjacent that gap is copied so as to fill the gap therewith and when the short strips overlap each other partly, one party of the overlapping short strips is erased.

Figure 13:
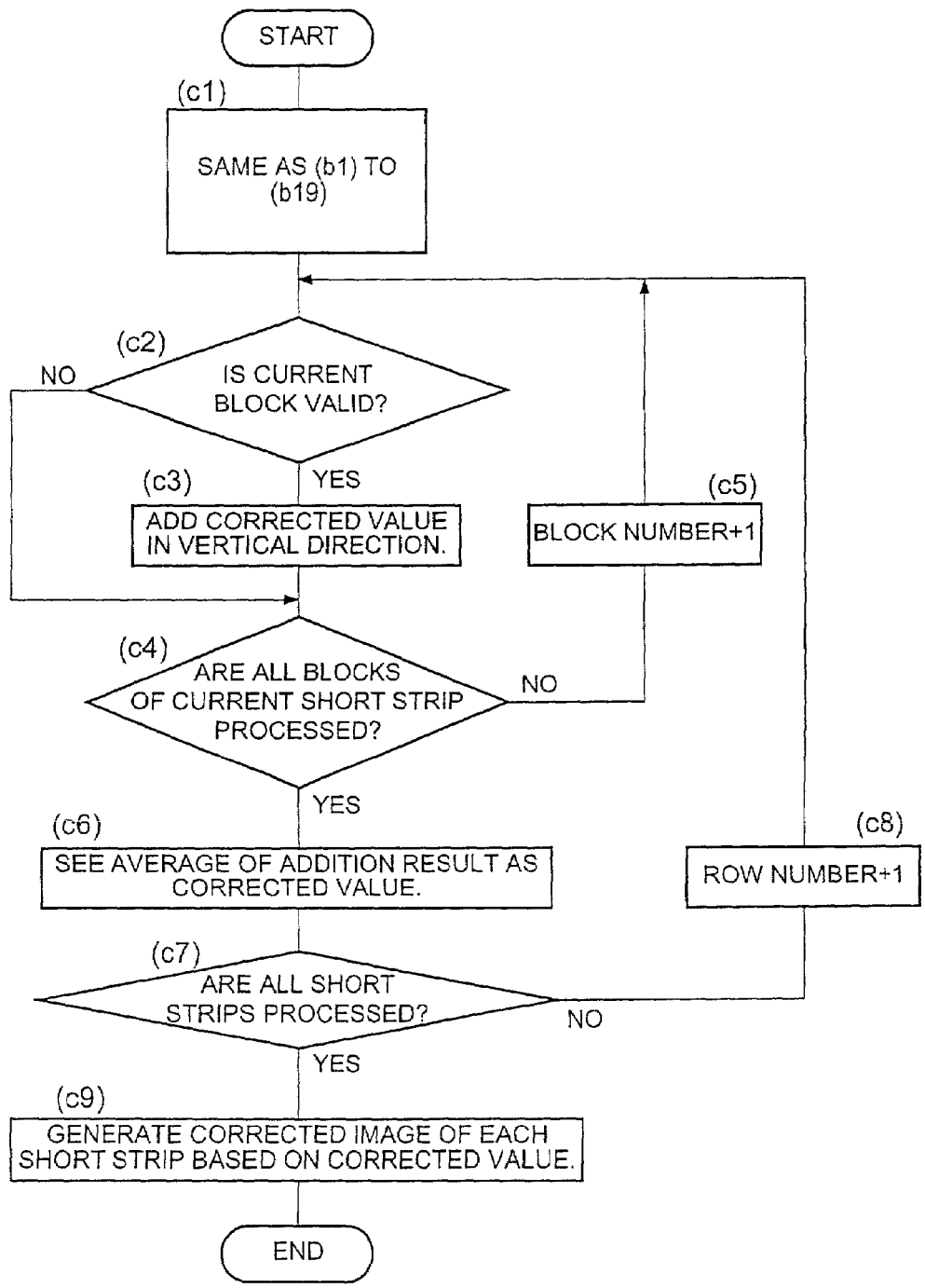
FIG. 13 is a flow chart showing a third example of processing in the corrected image generating apparatus of the present embodiment.

FIG. 13 is a flow chart showing a third example of processing in the corrected image generating apparatus 12 of this embodiment.

First, the same processing as steps b1 to b19 as FIGS. 10 and 11 is executed. That is, correlation computation is carried out on the culling image about each block so as to extract the feature point and the correlation computation is carried out on the raw image about each feature point so as to obtain a corrected value (motion vector) of each block.

In the processing of FIG. 13, a following processing is carried out about each short strip (steps c7 and c8). That is, when an attention is paid on a certain short strip, each block of plural blocks (n (see FIG. 7)) composing that short strip is checked successively (steps c4 and c5) and whether or not a currently checked block is an effective block as the feature point is determined (step c2). The corrected value about the effective block is added in the short strip (step c3) and after the processing of steps c2 and c3 is executed about all the blocks of that short strip, an average of the addition result is obtained. That average is employed as the corrected value of the short strip. After this processing for obtaining the average value is carried out about all the short strips (step c7), the position of each short strip is adjusted based on that corrected value (see FIG. 12) so as to generate the corrected image (step c9).

Figure 14:
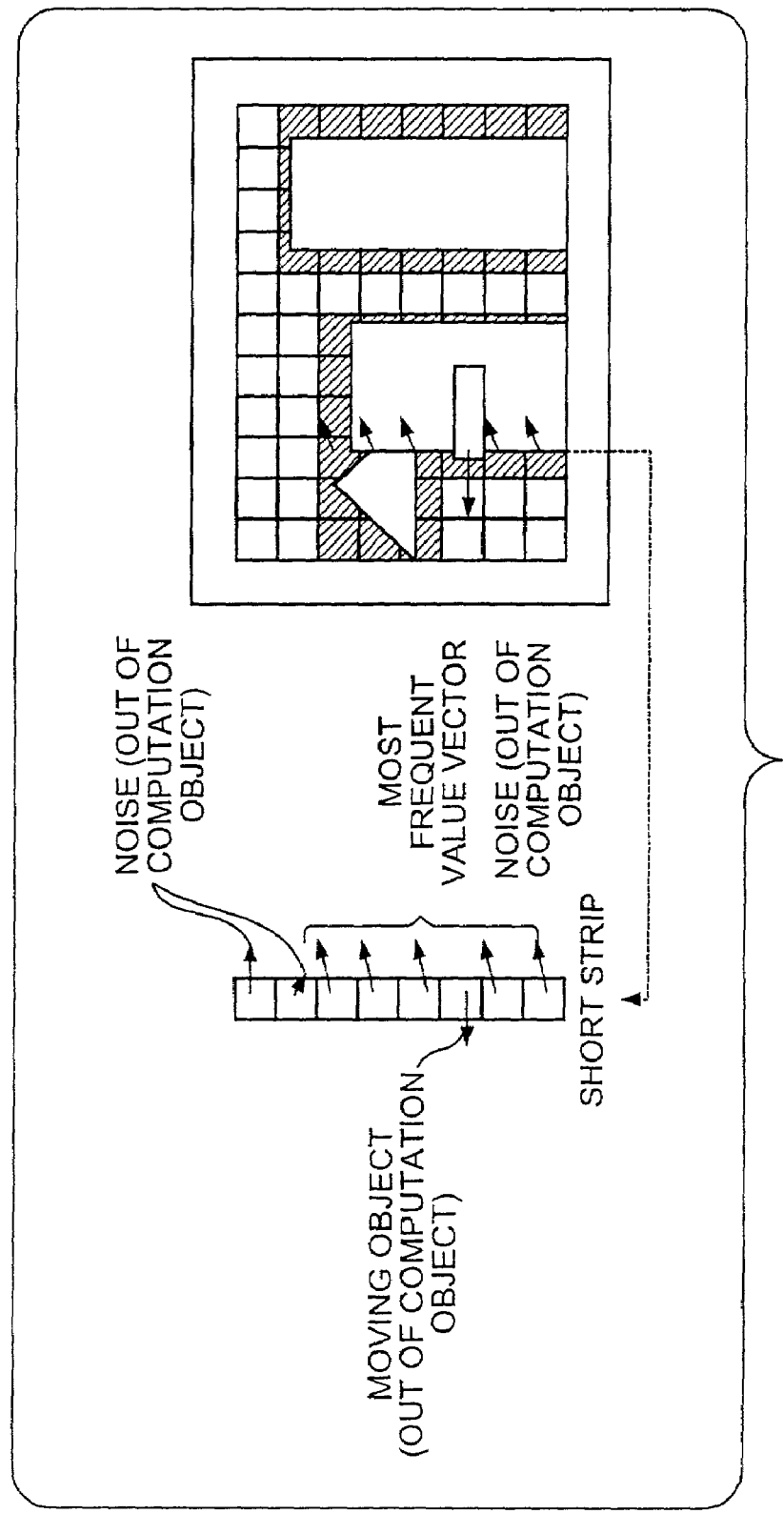
FIG. 14 is a conceptual diagram of moving object removal.

FIG. 14 is a conceptual diagram of moving object removal.

When an attention is paid upon a certain short strip and the corrected value (motion vector) of the feature point (hatched block) of plural blocks composing the short strip is viewed, there is not only a corrected value (motion vector) originated from only vibration of the camera but also a motion vector affected by the motion of an object such as a vehicle traveling on the ground, for example. Here, instead of obtaining an average of the corrected value (motion vector) of the plural blocks composing a short strip, the most frequent value vector is obtained. Consequently, the motion vector and noise of the moving object are excluded so as to obtain the motion vector due to vibration of the camera.

Figure 15:
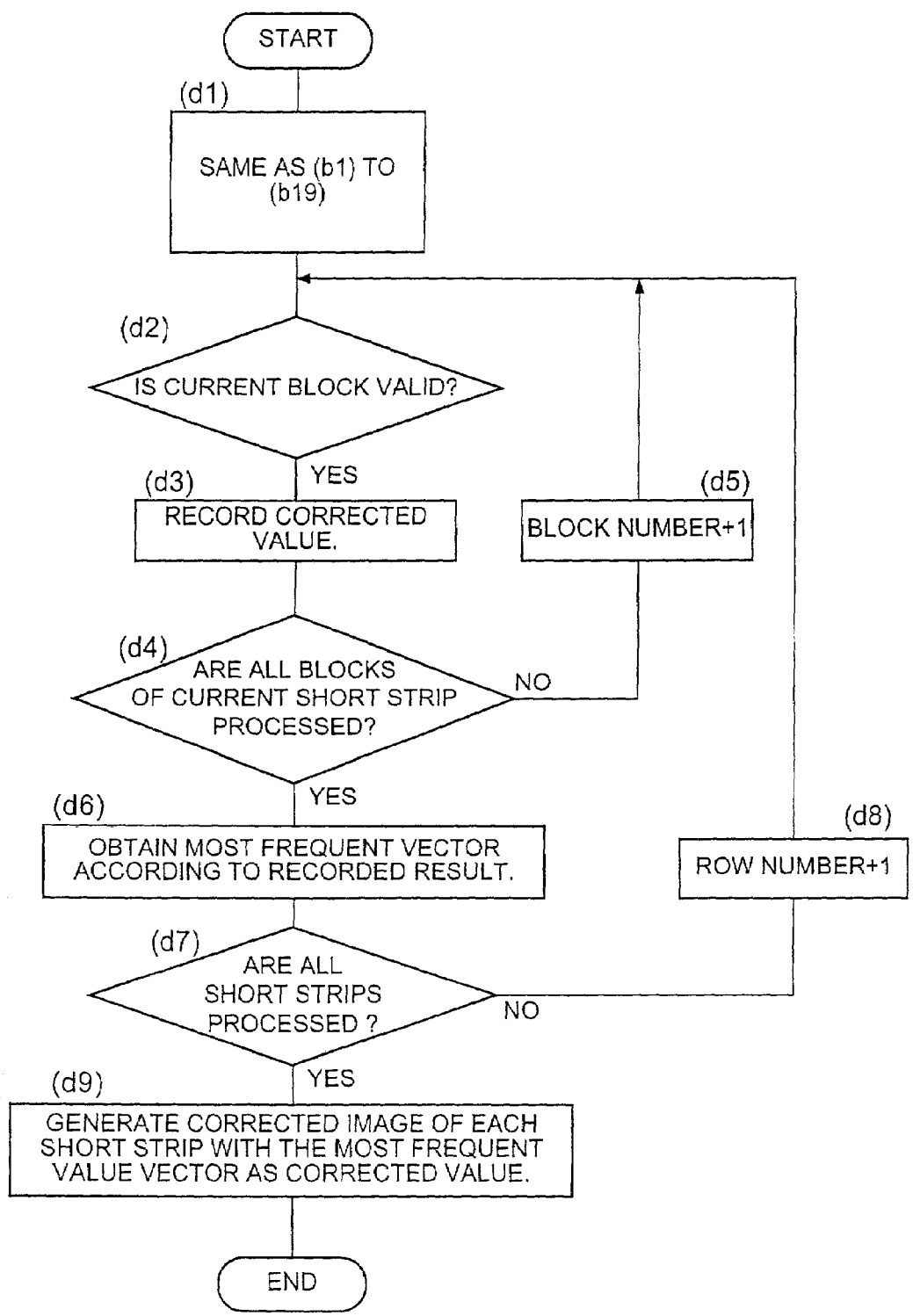
FIG. 15 is a flow chart showing a fourth example of processing in the corrected image generating apparatus of the present embodiment.

FIG. 15 is a flow chart showing a fourth example of the corrected image generating apparatus 12 of this embodiment.

First, the same processing as steps b1 to b19 of FIGS. 10 and 11 is carried out like the third example of FIG. 13 (step d1) and next, a following processing is executed about each short strip (steps d7 and d8). When an attention is paid to a certain short strip, each of plural blocks composing that short strip is checked successively (steps d4 and d5) and whether or not a currently checked block is an effective block as the feature point is determined (step d2). The corrected value (motion vector) of the effective block is recorded (step d3) and after processing of steps d2 and d3 about all blocks of the short strip is carried out, the most frequent value vector whose appearance frequency is the highest of all the corrected values (motion vector) recorded in the short strip is obtained and that most frequent value vector is regarded as the corrected value (motion vector) of the short strip (step d6).

After the processing for obtaining the most frequent value vector of each short strip is carried out about all the short strips (step d7), a corrected image is generated based on the corrected value (motion vector) of each short strip (step d9).

Figure 16:
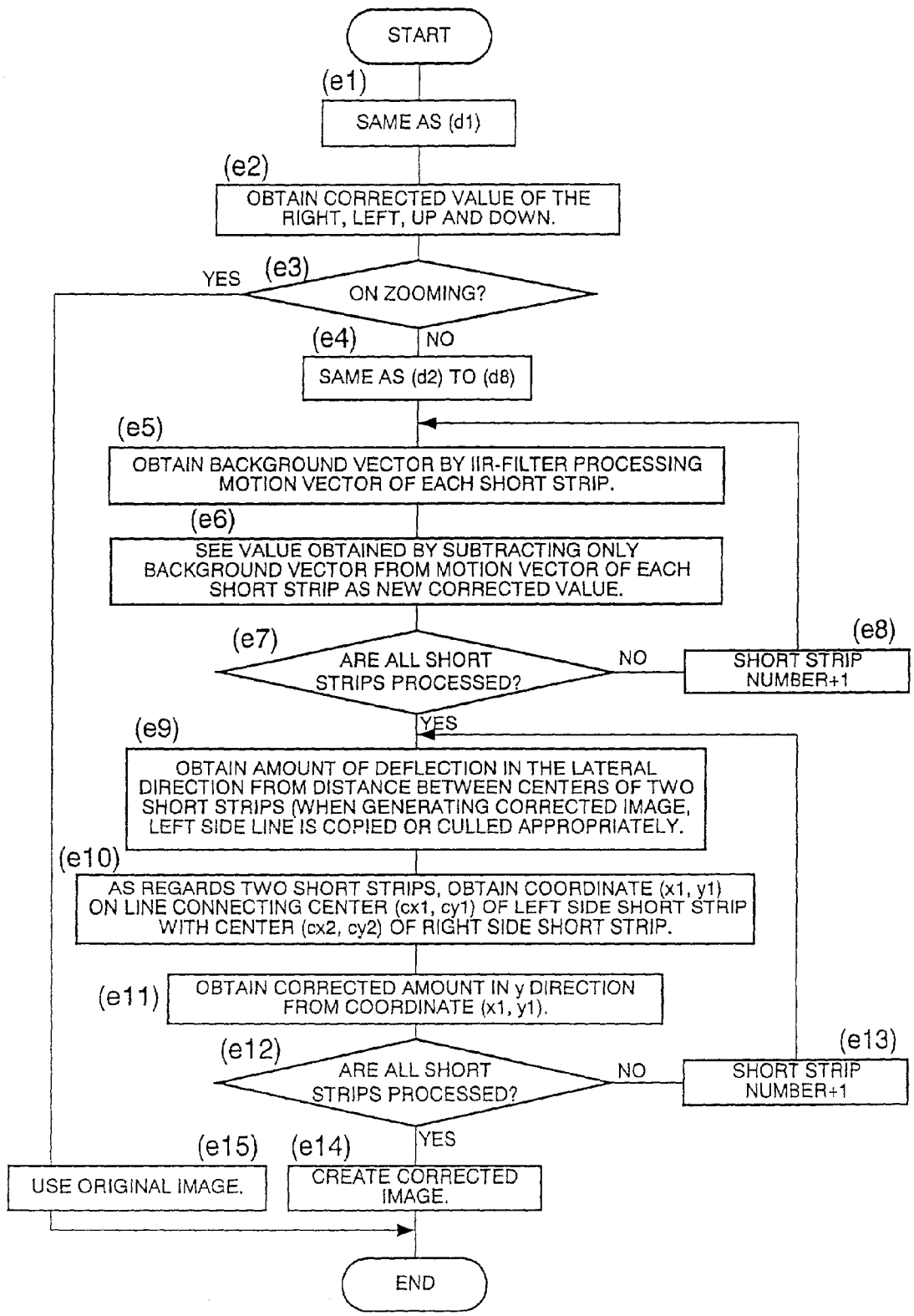
FIG. 16 is a flow chart showing a fifth example of processing in the corrected image generating apparatus of the present embodiment.

FIG. 16 is a flow chart showing a fifth example of processing in the corrected image generating apparatus 12 of this embodiment.

Here, the same processing as that of step d1 of the fourth example shown in FIG. 15, that is, the same processing as that of steps b1 to b19 of the second example shown in FIGS. 10 and 11 is carried out so as to obtain the corrected value (motion vector) of each block as the feature point (step e1).

Next, in the fifth example shown in FIG. 16, the respective corrected values of the right, left, up and down of the raw image are obtained (step c2) and whether or not zoom is being executed is determined (step e3).

Figure 17:
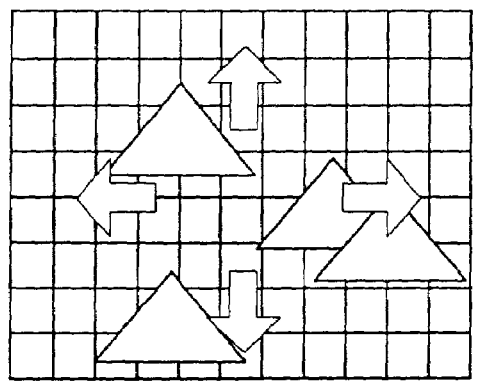
FIG. 17 is a diagram showing correction value (motion vector) for the left, right, up and down in zoom up.

FIG. 17 is a diagram showing the corrected value (motion vector) of the left, right, up and down during zooming-up.

To obtain the left, right corrected values, when the raw image is divided to two sections, right and left relative to the center, an average of the corrected value (motion vector) of a block as the feature point on the left side is obtained and then an average of the corrected value (motion vector) of a block as the feature point on the right side is obtained. Consequently, each corrected value (motion vector) composed of the left or right average is obtained.

The corrected values of up and down are the same. When the raw image is divided to two sections up and down relative to the center, an average of the corrected value (motion vector) of a block as the feature point on the upper side and an average of the corrected value (motion vector) of a block as the feature point on the lower side are obtained and then, the corrected value (motion vector) which is each average of the upper side and lower side is obtained.

In step e3, when the motion vector of the left, right, up and down obtained in this way is directed outward of the raw image as shown in FIG. 17 (during zooming-up) or inward of the raw image (during zooming-down), it is determined that zooming is being carried out.

Because it is meaningless to obtain the corrected image during zooming when it is determined that zooming is being carried out in step e3, the raw image is used for display on the monitor unit 13 of FIG. 1 as it is (step e15).

When it is determined that zooming is not being carried out in step e3, the processing proceeds to step e4, in which the same processing as steps d2 to d8 of the fourth example shown in FIG. 15 is executed so as to obtain the most frequent value vector of each short strip as the corrected value (motion vector) of each short strip.

Next, IIR filter processing is carried out on the motion vectors of plural frames in each short strip so as to obtain background vector. This IIR filter processing is carried out based on a following expression.

$$V_t' = 0.35 \times V_t + 0.65 \times V_{t-1} \quad (4)$$

Here, t and t−1 mean a frame at time t and a frame at time t−1 which is a time preceding by one frame, respectively. $V_t$, and $V_{t-1}$ mean a motion vector in a frame at time t of a short strip on which attention is paid and a motion vector in a frame at time t−1 which is a time preceding by one frame. $V_t'$ means a motion vector after IIR filter processing in a frame at time t of the short strip on which attention is paid. The expression (4) means low-pass filtering processing. The background vector is a motion vector which excludes components originated from vibration or the like of the camera and is originated from a slow change of an entire raw image even when a view object is still, the slow change being caused by flight of the airplane of FIG. 1.

In step e6, the background vector is subtracted from the motion vector of each short strip and a value of its result is employed as a new corrected value (motion vector). This new corrected value (motion vector) is a corrected value (motion vector) which is originated from vibration or the like of the camera while excluding a component (background vector) of a slow motion of the entire raw image.

Next, regarding a short strip on which attention is paid and an adjacent short strip, a deflection amount in the lateral direction from a distance between the centers of the two short strips is obtained (step e9) successively about all the short strips (steps e12 and e13).

Figure 18:
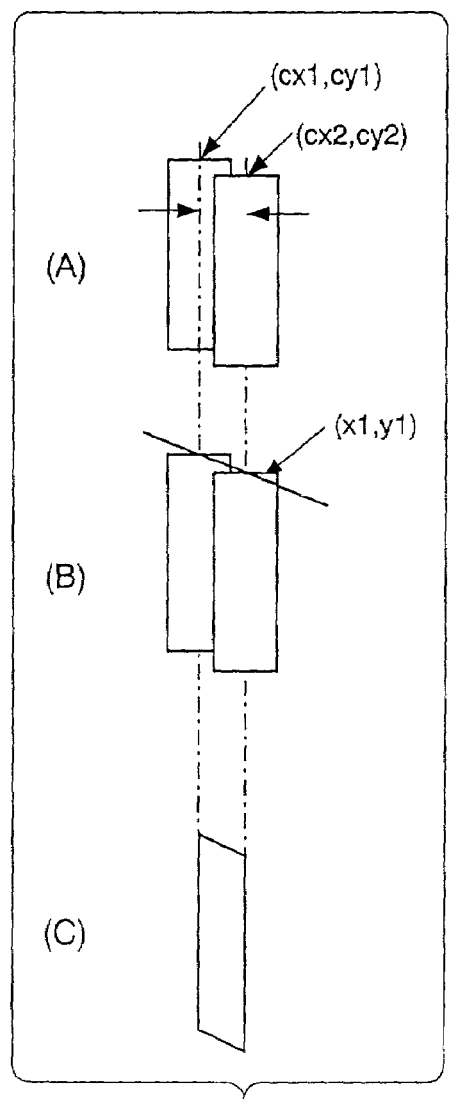
FIG. 18 is an explanatory diagram of processing in steps e9 to e11 of FIG. 16.

FIG. 18 is an explanatory diagram of processing in steps e9 to e11 of FIG. 16.

This figure indicates a relation of the positions of two short strips adjacent, which are corrected according to corrected values (motion vectors) of those two short strips.

Here, the adjacent two short strips are deflected not only vertically but also laterally, so that they overlap each other partly.

In step e9, a distance d between the centers of the adjacent two short strips is obtained.

When the corrected image is generated, the distance d is larger than a proper distance. When there is a gap between two short strips, a vertical line of a short strip on the left side of those two short strips is copied so as to fill that gap therewith. When the distance d is smaller than the proper distance while those two short strips overlap each other partly, the overlapping of the two short strips is eliminated by culling the vertical line.

Next, regarding adjacent two short strips, a coordinate of a line connecting an origin (cx1, cy1) of a short strip on the left side with an origin (cx2, cy2) of a short strip on the right side is obtained in step e10.

FIG. 18 part (A) shows coordinates (cx1, cy1) and (cx2, cy2) of the origins of two short strips and FIG. 18 part (B) shows a line connecting those two coordinates.

In step e10, coordinate (x1, y1) on each line in which pixels are arranged vertically in a short strip is obtained and in step e11, a correction amount in y direction is obtained from that coordinate (x1, y1) for each line.

FIG. 18 part (C) is a diagram showing a condition in which the respective lines are moved in the y direction according to the correction amount obtained for each line. When the corrected image is generated, a line of an overlapping portion of the two short strips is erased according to the distance d obtained in step e9 and when there is a gap between the two short strips, the line is copied so as to fill that gap therewith. At the same time, the position of each line in the y direction is corrected so as to obtain a partial image as shown in FIG. 18 part (C).

After the processing of steps e9 to e11 of FIG. 16 is carried out about adjacent two short strips successively (steps e12 and e13), the corrected image is created according to the corrected value (motion vector) of each short strip, a distance d between the centers of the adjacent two short strips (see FIG. 18 part (A)) and the coordinate (x1, y1) on a line connecting the centers of the adjacent two short strips (see FIG. 18 part (B))(step e14).

The corrected image created in this way is sent to the monitor unit 13 shown in FIG. 1 and that corrected image is displayed on the monitor unit 13.

The generation of the corrected image is executed successively for the raw images of plural frames fetched successively and the ground image is displayed on the monitor unit 13 in the form of animation. This monitor unit 13 displays a stabilized easy-to-see animation from which an influence of vibration of the infrared ray camera 11 shown in FIG. 1 is removed.

As described above, according to the present invention, a corrected image easy to see from which an influence of the vibration of a camera is removed is generated.

What is claimed is:

1. A corrected image generating apparatus for generating a corrected image by correcting a deflection due to vibration of a camera in a raw image obtained by said camera which obtains raw images of a plurality of frames successively by scanning an object field of vision repeatedly, said corrected image generating apparatus comprising:

a one-dimensional image pickup device to scan a raw image via a plurality of light receiving sensors arranged one-dimensionally in a scanning direction intersecting an arrangement direction of the plurality of light receiving sensors including the one-dimensional image pickup device;

a pattern matching portion to divide the raw image into grids and to perform pattern matching processing about adjacent frames in blocks of the grids, the blocks of the grids being of a same size, to thereby provide pattern matching data;

a feature point extracting portion to extract a block as a feature point on the pattern matching of the raw image, after the pattern matching processing has been performed and in accordance with the pattern matching data obtained by said pattern matching portion;

a motion vector computing portion to obtain a motion vector of said feature point based on the pattern matching data obtained by said pattern matching portion about the feature point extracted by said feature point extracting portion; and an image correcting portion to obtain a corrected image in which deflection of the raw image is corrected based on the motion vector obtained by said motion vector computing portion about the feature point extracted by said feature point extracting portion.

2. A corrected image generating apparatus according to claim 1, further comprising an image culling portion to generate a culling image by culling pixels of the raw image, wherein said feature point extracting portion controls said pattern matching portion to carry out the pattern matching processing about a culling image created by said image culling portion so as to extract a feature point based on the result of the pattern matching processing about the culling image; and said motion vector computing portion controls said pattern matching portion to carry out the pattern matching processing about a block of the feature point extracted by said feature point extracting portion in a raw image prior to culling so as to obtain a motion vector of the feature point based on the result of the pattern matching processing about the raw image.

3. A corrected image generating apparatus according to claim 1, wherein
said motion vector computing portion obtains a motion vector of each short strip of a plurality of short strips based on the motion vector of the feature point in the short strip including a plurality of blocks arranged in said arrangement direction of the plurality of blocks produced by dividing the raw image into grids; and
said image correcting portion obtains a corrected image by correcting the relation of positions of the short strips based on the motion vector of each short strip obtained by said motion vector computing portion.

4. A corrected image generating apparatus according to claim 3, wherein said motion vector computing portion obtains a most frequent value vector in a motion vector of the feature point in said short strip as a motion vector of said short strip.

5. A corrected image generating apparatus according to claim 1, wherein
said motion vector computing portion obtains a new motion vector originated from vibration of said camera by carrying out processing including filtering processing aiming at the plurality of frames upon an obtained motion vector; and
said image correcting portion obtains said corrected image based on said new motion vector obtained by said motion vector computing portion.

6. A corrected image generating apparatus according to claim 3, wherein
said motion vector computing portion obtains a new motion vector originated from vibration of said camera by carrying out processing including filtering processing aiming at the plurality of frames upon an obtained motion vector; and
said image correcting portion obtains said corrected image based on said new motion vector obtained by said motion vector computing portion.

7. A corrected image generating apparatus according to claim 3, wherein said image correcting portion obtains a corrected image in which deflection between adjacent short strips in said arrangement direction is eliminated by shifting pixels arranged in said scanning direction in a short strip in the said arrangement direction.

8. A corrected image generating apparatus according to claim 1, further comprising an on-zooming discriminating portion to discriminate whether zooming is being carried out based on a motion vector obtained by said motion vector computing portion,
wherein when said on-zooming discriminating portion discriminates that zooming is being carried out, said image correcting portion interrupts generation of the corrected image.

9. A computer readable storage medium comprising a corrected image generating program which is executed in a computer for actuating said computer as a corrected image generating apparatus for generating a corrected image by correcting a deflection due to vibration of a camera in a raw image obtained by said camera which obtains the raw images of a plurality of frames successively by scanning an object field of vision repeatedly, said corrected image generating program comprising:
a one-dimensional image pickup portion to scan the raw image repeatedly using a one-dimensional image pickup device in which a plurality of light receiving sensors are arranged one-dimensionally in a scanning direction intersecting an arrangement direction of the plurality of light receiving sensors including the one-dimensional image pickup device;
a pattern matching portion to divide the raw image into grids and to perform pattern matching processing about adjacent frames in blocks of grids, the blocks of the grids being of a same size, to thereby obtain pattern matching data;
a feature point extracting portion to extract a block as a feature point on the pattern matching of the raw image after the pattern matching processing has been performed and in accordance with the pattern matching data obtained by said pattern matching portion;
a motion vector computing portion to obtain the motion vector of said feature point based on the pattern matching data obtained by said pattern matching portion about the feature point extracted by said feature point extracting portion; and
an image correcting portion to obtain a corrected image in which deflection of the raw image is corrected based on the motion vector obtained by said motion vector computing portion about the feature point extracted by said feature point extracting portion.

10. A corrected image generating program storage medium according to claim 9, wherein the corrected image generating program further comprising an image culling portion for generating a culling image by culling pixels of the raw image, wherein
said feature point extracting portion controls said pattern matching portion to carry out the pattern matching processing about a culling image created by said image culling portion so as to extract a feature point based on the result of the pattern matching processing about the culling image; and
said motion vector computing portion controls said pattern matching portion to carry out the pattern matching processing about a block of the feature point extracted by said feature point extracting portion in a raw image prior to culling so as to obtain a motion vector of the feature point based on the result of the pattern matching processing about the raw image.

11. A corrected image generating program storage medium according to claim 9, wherein said motion vector computing portion obtains a motion vector of each short strip of a plurality of short strips based on the motion vector of the feature point in the short strip composed of plural blocks arranged in said arrangement direction of plural blocks produced by dividing the raw image into grids and
said image correcting portion obtains a corrected image by correcting the relation of the positions of the short strips based on the motion vector of each short strip obtained by said motion vector computing portion.

12. A corrected image generating program storage medium according to claim 11, wherein said motion vector computing portion obtains a most frequent value vector in a motion vector of the feature point in said short strip as a motion vector of said short strip.

13. A corrected image generating program storage medium according to claim 9, wherein said motion vector computing portion obtains a new motion vector originated from vibration of said camera by carrying out processing including the filtering processing aiming at the plurality of frames upon an obtained motion vector and said image correcting portion obtains said corrected image based on said new motion vector obtained by said motion vector computing portion.

14. A corrected image generating program storage medium according to claim 11, wherein said motion vector computing portion obtains a new motion vector originated from vibration of said camera by carrying out processing including the filtering processing aiming at plural frames upon an obtained motion vector and said image correcting portion obtains said corrected image based on said new motion vector obtained by said motion vector computing portion.

15. A corrected image generating program storage medium according to claim 11, wherein said image correcting portion obtains a corrected image in which deflection between adjacent short strips in said arrangement direction is eliminated by shifting pixels arranged in said scanning direction in a short strip in said arrangement direction.

16. A corrected image generating program storage medium according to claim 9, wherein the corrected image generating program comprising an on-zooming discriminating portion to discriminate whether zooming is being carried out based on a motion vector obtained by said motion vector computing portion, wherein when said on-zooming discriminating portion discriminates that zooming is being carried out, said image correcting portion interrupts generation of the corrected image.

17. An apparatus having a camera, for generating a corrected image based upon a raw image obtained by the camera, the apparatus comprising:

a one-dimensional image pickup device to receive the raw image via a piurality of light receiving sensors arranged one-dimensionally in a scanning direction intersecting an arrangement direction of the plurality of light receiving sensors including the one-dimensional image pickup device;

a pattern matching portion to divide the raw image into grids and to perform pattern matching of adjacent frames of blocks within the grids, the blocks of the grids being of a same size, to thereby provide pattern matched data;

a feature point extracting portion to extract a block as a feature point of the pattern matched data after the pattern matching has been performed;

a motion vector computing portion to obtain a motion vector of the extracted feature point; and a correcting portion to obtain the corrected image in which deflection of the raw image is corrected based on the motion vector obtained and the extracted feature point.

* * * * *

UNITED STATES PATENT AND TRADEMARK OFFICE
CERTIFICATE OF CORRECTION

| | |
|---|---|
| PATENT NO. | : 7,333,132 B2 |
| APPLICATION NO. | : 11/078433 |
| DATED | : February 19, 2008 |
| INVENTOR(S) | : Katsutoshi Shimizu et al. |

Page 1 of 1

It is certified that error appears in the above-identified patent and that said Letters Patent is hereby corrected as shown below:

Column 18, line 9, delete "piurality" and insert --plurality--.

Signed and Sealed this

First Day of July, 2008

JON W. DUDAS
*Director of the United States Patent and Trademark Office*